United States Patent [19]

Simon

[11] Patent Number: 4,692,246
[45] Date of Patent: Sep. 8, 1987

[54] CARTRIDGE FILTER WITH PLURAL MEDIAS

[76] Inventor: Abraham E. Simon, 1122 Kenyon Ave., Plainfield, N.J. 07060

[21] Appl. No.: 853,053

[22] Filed: Apr. 17, 1986

[51] Int. Cl.$^4$ .................. B01D 27/02; B01D 27/08
[52] U.S. Cl. ........................... 210/232; 210/255; 210/262; 210/282; 210/311; 210/317; 210/456
[58] Field of Search ............... 210/255, 262, 264, 265, 210/266, 273, 279, 282, 283, 311, 316–317, 419–420, 435, 455, 456, 484, 232.

[56] References Cited

U.S. PATENT DOCUMENTS

| | | | |
|---|---|---|---|
| 1,171,408 | 2/1916 | Barstow | 210/311 |
| 1,548,657 | 8/1925 | Cavanaugh | 210/311 |
| 1,645,712 | 10/1927 | Meyers | 210/265 |
| 2,605,901 | 8/1952 | Morrison et al. | 210/282 |
| 2,633,990 | 4/1953 | Simpson et al. | 210/282 |
| 3,043,432 | 7/1962 | Megesi | 210/311 |
| 3,126,333 | 3/1964 | Williams | 210/311 |
| 3,204,770 | 9/1965 | Brink | 210/282 |
| 3,272,336 | 9/1966 | Humbert, Jr. | 210/311 |
| 3,426,905 | 2/1969 | Kalfas | 210/266 |
| 3,841,484 | 10/1974 | Domnick | 210/282 |
| 4,072,615 | 2/1978 | McConnell | 210/282 |

*Primary Examiner*—Richard V. Fisher
*Assistant Examiner*—Wanda L. Millard
*Attorney, Agent, or Firm*—Robert D. Farkas

[57] ABSTRACT

A fluid filter apparatus uses an outer container configured to receive a removable columnar-like filter having its largest filter elements located at the bottom and its finest filter elements located at the top, from which a port communicates to a space within the housing, outwardly of the filter, for storing the cleaned fluid. The fluid to be cleaned passes through the columnar filter through a pipe through a space immediately below the filter. A pan-like dish communicates to the upper portion of the pipe to receive the fluid to be cleaned. A valve communicates to the storage area adjacent the inner walls of the housing and is used to draw off the cleaned fluid when required.

6 Claims, 2 Drawing Figures

CARTRIDGE FILTER WITH PLURAL MEDIAS

BACKGROUND OF THE INVENTION

1. The Field of the Invention

Many industrial applications utilize solvents, thinners, lacquers, and other expensive fluids whose useful life is shortened due to such fluids becoming dirty and carrying along dirt, contaminants such as paint, grit, dirt, metallic or paint chips and the like. The industrial user of such liquids often lacks the facilities to inexpensively and safely clean these often volatile fluids periodically and safely. The present invention and provides a mechanism which permits industrial and commercial users to store the liquids that are being cleaned in the same device that cleans them, as well as providing a place for the clean liquid to be stored, ready for use.

2. Description of the Prior Art

The prior art abounds with filtering devices. U.S. Pat. No. 2,605,901, issued Aug. 5, 1952 to S. O. Morrison, et al, teaches a filter for removable cartridges employing a tubular-like casing and having therewithin a removable cartridge utilizing gravel, asbestos, carbon and sand in succession, starting at the top of the cartridge where the gravel is located and through which area the input liquid is diverted. The bottom of the filter, adjacent the sand end thereof, communicates the interior of the tubular housing which carries the filtered material outwardly through an exit tube. Here the fluid to be filtered must be brought to the filter which will permit the liquid to be filtered at a rate purely dependant upon the force of gravity and the resistance of the filter to accommodate the passage of the fluid to be cleaned. Once the liquid is introduced to the filter it will unrestrainedly traverse the filter medium, limited only by the resistance of the filter medium, thus passing the fluid through the filter at a rapid rate. This tends to compel the particulates, of the fluid to be cleaned, to find their way rapidly through the spaces separating the particles of carbon, sand, or gravel in the filter and to cause tractways.

U.S. Pat. No. 2,633,990, issued Apr. 7, 1953 to A. J. Simpson, et al., disclosed a filter in which the inner cartridge-like device, comprising a vertical casing holding a filtering medium, is disposed within an outermost housing adapted to receive and store cleaned fluid therewithin. The Simpson teaching recognizes the difficulty encountered in the fluid passing through the filter at such a rate so as to cause channels which decrease the filtering effect. The disclosure teaches means to minimize same.

R. V. Brink disclosed, in the U.S. Pat. No. 3,204,770, issued on Sept. 7, 1965, a portable water softener which introduces water within the central passageway of an annular filter. The water courses through the filter emerging on the cylindrical sides to be captured within an overall housing communicating from the sides of the filter downwardly to an exit port in the outermost housing. Here the fluid to be cleaned passes through the wall of the annular filter and immediately emerges outwardly from the filter in a one-pass operation. The water when first introduced to the filter is exposed to its smaller surface area (at its innermost cylindrical surface). Hence, the velocity here is at its highest, where the coarsest particles are intended to be filtered out. As the fluid emerges outwardly toward the cylindrical outermost surface of the annular filter, each particle is traveling at a slower velocity, coming into contact with more surface area than the liquid as initially introduced to the filter. The heavier particles have a tendency to quickly clog up the interior cylindrical surface of the filter. Once the clogging process commences, there is less area left for the fluid to course through and resulting in an ever increasing tendency for clogging.

SUMMARY OF THE INVENTION

It is among the objects of the present invention to provide a fluid filter apparatus wherein the dirty fluid is first permitted to settle without passing through any filter medium, thus permitting the fluid to separate larger dirt particles before they are introduced to a filtrate material.

It is another object of the present invention to provide a vertical cartridge through which the liquid to be filtered must entirely pass having the heavier and coarser filtrate particles at the bottom and the finer filtrate particles at the top, so as to insure that the heavier and larger sediment tends to be directed away from the finer filtrate materials, thus avoiding clogging.

It is still another object of the present invention to provide that the liquid to be filtered passes through the filtrate mediums at a slow rate, whilst not being under substantial pressure, thus insuring that there is greater time and hence, greater efficiency to filter out particles of all sizes carried by the fluid to be cleaned.

Yet another object of the present invention is to provide a receptacle for the filtered fluid which is mounted adjacent to the filter area itself, which serves as a reservoir for containing the filtered fluid ready to be drawn off for reuse.

It is still yet another object of the present invention to provide the filtrate mediums in a disposable cartridge which can be easily and conveniently assembled to the fluid settling tank and within an outermost housing.

It is still yet another object of the present invention to provide a fluid filtering device which is inexpensive to manufacture, easy to use, does not require any electrical power or pressure generating equipment and is effective for its intended purpose.

The present invention contemplates an outermost housing, having connected thereto a faucet-like device coupled to the innermost regions of the housing, near the bottom thereof. Disposed within the housing is a vertical cylindrical-like filter which is provided having a plurality of openings in the bottommost lateral surface. Legs are provided such that the bottommost lateral surface is positioned above the innermost lower lateral surface of the housing. Passing through the center of the cartridge is a tubular-like passageway which extends upwardly from the bottommost lateral surface of the cartridge to a point somewhat below the uppermost edge of the outermost housing. Secured to the uppermost regions of the tube is a threaded portion. A dish-like device, having a central threaded region, is adapted to threadingly engage the thread on the central pipe of the cartridge filter. The top of the cartridge, at a point somewhat below the bottommost edge of the dish-like device, communicates outwardly from the cartridge, at one or more points, to a discharge port that empties into the interior of the outermost housing, in an area not otherwise occupied by the cartridge. A lid may be hingeably secured to the rim of the dish-like portion of the device so as to entirely cover and close the mouth of the dish. The dish is adapted to have its marginal edges engage the interior of the outermost housing. The filtrate materials disposed adjacent the lowermost lateral surface of the cartridge are made up of coarse filtering materials such as crushed stone, stone chips, and the like. Another layer of materials, filling a next uppermost portion of the cartridge may consist of finer particles of the same material or other materials such as fine stone. Sand, grit, Fuller's earth, and activated charcoal may be disposed in succession, respectively thereabove as well as many other well known filtrate materials, such that the finest and most effective filtrate material is disposed in an uppermost position, adjacent the exit port or ports of the cartridge.

As the fluid to be cleaned is manually poured into the dish portion of the apparatus, such fluid will sit there, without entering the tubular entranceway to the cartridge, until the fluid level reaches the point that the fluid level within the dish exceeds the height of the uppermost lip of the central tube. During this waiting process, particulates settle out of the fluid, which particulates can be easily mechanically removed from time to time. The now coarsely cleaned fluid, to the extent that the volume of same exceeds the storage volume of the dish, enters the tube and passes downwardly to reside within the space immediately below the bottommost surface of the filter. Here again, a settling effect takes place, which permits the fluid to have its larger particles separate outwardly before entering the filter itself. When the level of the fluid found below the lowermost lateral surface of the filter has reached a point that the fluid to be cleaned is that above the height of the lowermost lateral surface of the cartridge, the fluid to be cleaned will enter the confines only of the cartridge and encounter in succession the various layers of filtrate medium. The fluid will first encounter the coarsest materials and then proceed through the finest materials. Since the fluid is progressing upwardly only at a rate dependant upon filling the dish and whether or not there is fluid in the receiving dish which is capable of entering the central tube, the passage of the fluid is slow, thus insuring a better cleaning action. When the fluid to be cleaned passes through the uppermost regions of the filter, it will pass through a final portion of the filter which is a combination of a paper-like annular housing having in its central region a fine powder-like filtrate medium, such as activated charcol. Emanating outwardly from the paper-like housing is a tube which passes through the wall of the cartridge and enters into a storage cavity formed by the outermost wall of the filter cartridge in the innermost wall of the outerhousing. The free end of such tube communicates above the region wherein the cleaned fluid is stored and may ultimately be drawn off by manual operation of the faucet.

The cartridge may be removed by threadingly disengaging the dish from the central tube and disposing the dish and its associated cover away from the uppermost region of the cartridge. The cartridge, as well as its central tube and annular final filtrate device, may be cleaned by reverse flushing, in a manner well known in the art. The dish, the centralmost region of the outermost housing below the cartridge, and the edge and the bottom of the storage areas of the outermost housing, each serving as separate sediment tanks, may be easily manually cleaned prior to the insertion of a new or cleaned cartridge, when ready for the next use of the device.

DESCRIPTION OF THE PREFERRED EMBODIMENT

Figure 1:
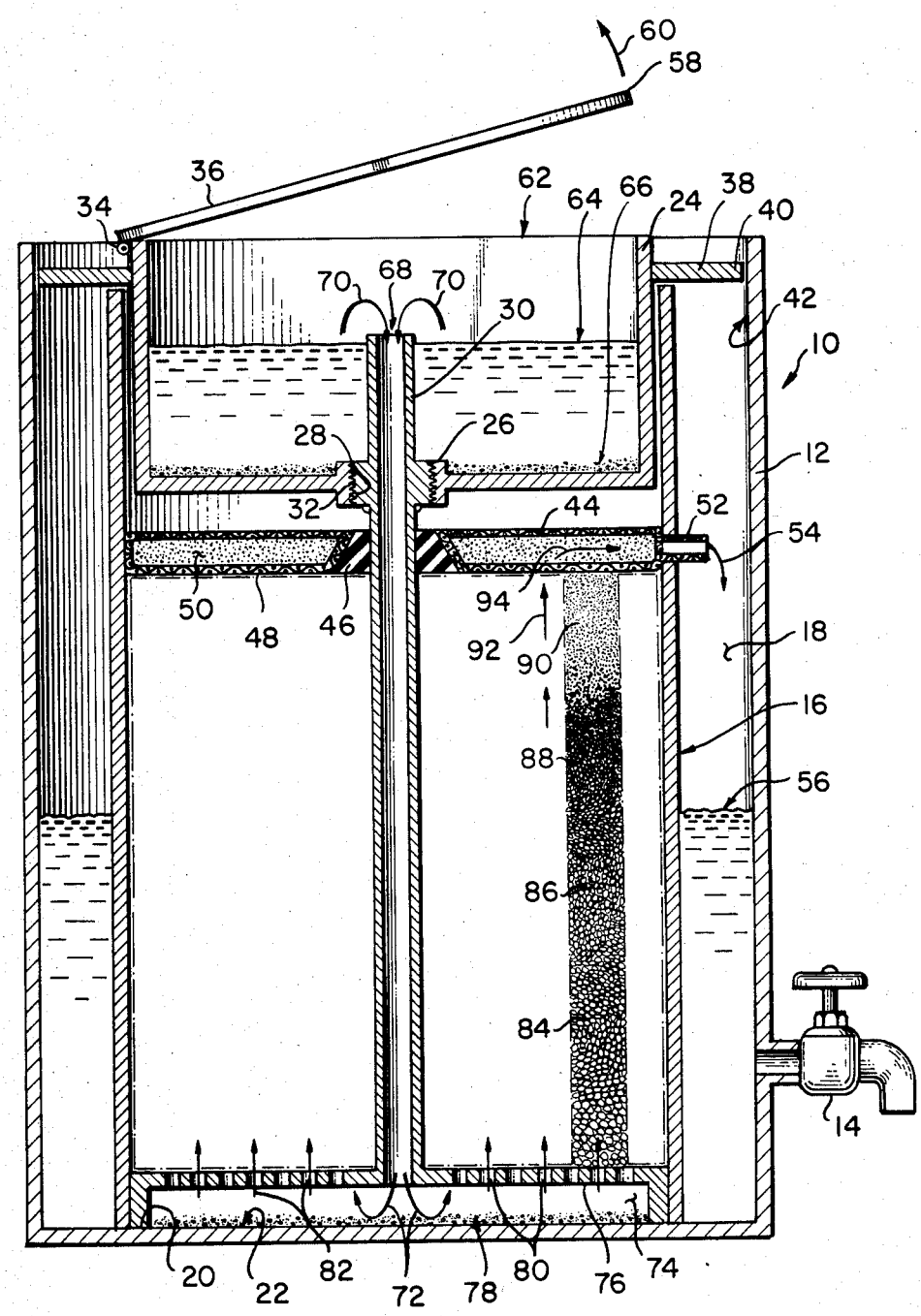
FIG. 1 is a side elevation, cross sectional view of the present invention.

Referring to the figures, and more particularly to the embodiment illustrated in FIG. 1, the present invention 10 is shown having an outermost housing 12 to which is fitted valve 14. Cartridge 16 is shown disposed within cavity 18. The lowermost edges 20 of cartridge 16 communicates with the lowermost lateral surface 22 of housing 12, creating a fluid seal thereby. Dish 24 is shown having a threaded region 26 in its central area. Thread 28, secured to tube 30, threadingly engages thread 32 formed in dish 24. A watertight seal is thus achieved. Hinge 34 hingeably secures cover 36 to dish 24. Annular flange 38 has its peripheral edge 40 loosely in contact with interior surface 42 of housing 12. Annular cartridge 44 communicates with a wedge-like structure 46 secured to tube 30. Paper-like walls 48 of annular cartridge 44 house a fine filtrate medium 50 disposed within housing 44. Spout-like portion 52 communicates to the interior of housing 44 and permits liquid, passing in the direction of arrow 54 to store within cavity 18, making up liquid 56 as shown.

Hinge 36 may have end 58 move upwardly and outwardly in the direction of arrow 60 so as to expose mouth 62.

In use, liquid is introduced into mouth 62 of dish 24, so as to be stored in the position shown by liquid 64. Particulate particles 66 accumulate by settling. When liquid 64 has reached the height to approximate the height of mouth 68 of tube 30, liquid 64 will proceed in the direction of arrows 70 and enter tube 30. Such liquid will emerge from the bottom of tube 30 and pass in the direction of arrows of 72. Cavity 74, formed below the lowermost lateral surface 76 of cartrideg 16, permits the fluid to settle out more particles 78 on surface 22. Holes 80, disposed in surface 76, permit the fluid to enter the bottommost regions of the cartridge passing in the direction of arrows 82. Filtrate materials 84 through 90 comprise coarse to fine filtering mediums in a manner well known in the art. The fluid will finally enter annular cartridge 44, passing through the walls, which serve also as a filter medium. Particulate 50, found within cartridge 44, further serves to filter the fluid. The fluid proceeding in the direction of arrows 92 and then 94 emerges to proceed in the direction of arrow 54 only to be stored within housing cavity 18.

It should be noted that if the device is not adequately filtering because of an overconcentration of sediment and particulate being accumulated by the filter, by a clogging of pipe 30, or by a packing of the content of cartridge 44, the liquid level will not go down to the top of tube 30, when further fluid to be cleaned is added to the interior of dish 24. This would signal that the filter units are probably clogged and require cleaning or replacement. When this occurs however, fluid 56, the clean fluid, remains clean and is available to be drawn off and used in any event, providing a reserve capacity of clean fluid despite the fact that the filter mechanism itself is disabled.

Figure 2:
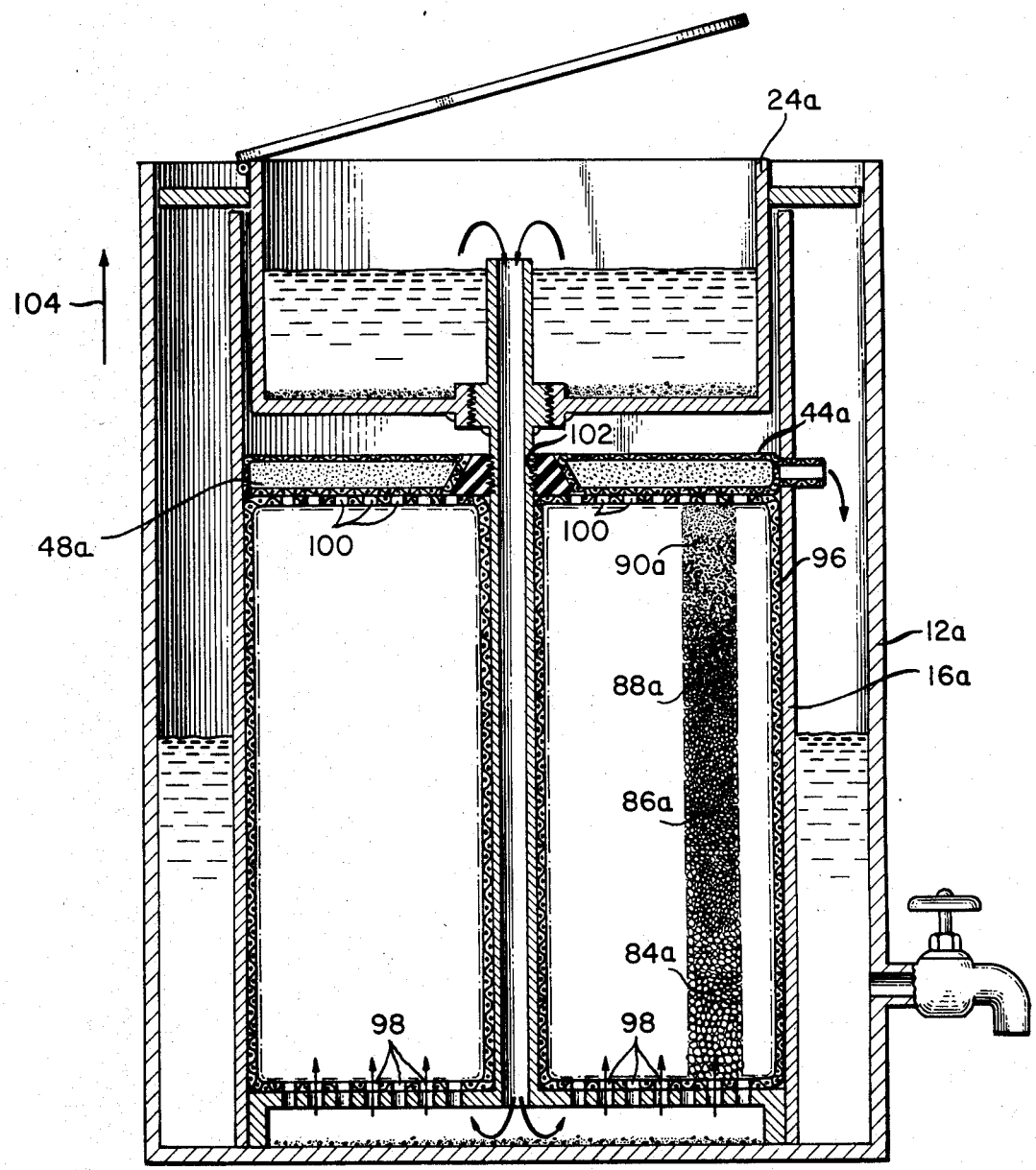
FIG. 2 is a side elevation, cross sectional view of an alternate embodiment of the present invention.

FIG. 2 illustrates outermost housing 12A having cartridge 16A there within. Disposed beneath annular cartridge 44A is elongated annular filtrate material holding cartridge 96, containing therewithin filtrate materials 84A, 86A, 88A and 90A, as used in FIG. 1. Holes 98 are shown located at the lowermost end of elongated annularly shaped filtrate material holding cartridge 96 to permit the ingress of unstrained liquids therethrough. Holes 100 are located in the uppermost regions of cartridge 96 and permit the passage of cleaned liquids upwardly there through so as to enter the lowermost regions 48A of housing 44A. Cartridge 96 may be removed upon dish 24A being disengaged from the apparatus, followed by a removal of cartridge 44A. Threads 102 facilitate the removal of cartridge 44A and thereby permit the easy withdrawal upwardly, in the direction of arrow 104 of cartridge 96 for reverse cleaning or replacement as desired.

It is among the advantages of the present invention to provide a fluid filter apparatus wherein the dirty fluid is first permitted to settle without passing through any filter medium, thus permitting the fluid to separate larger dirt particles before they are introduced to a filtrate material.

It is another advantage of the present invention to provide a vertical cartridge through which the liquid to be filtered must entirely pass having the heavier and coarser filtrate particles at the bottom and the finer filtrate particles at the top, so as to insure that the heavier and larger sediment tends to be directed away from the finer filtrate materials, thus avoiding clogging.

It is still another advantage of the present invention to provide that the liquid to be filtered passes through the filtrate mediums at a slow rate, whilst not being under substantial pressure, thus insuring that there is greater time and hence, greater efficiency to filter out particles of all sizes carried by the fluid to be cleaned.

Yet another advantage of the present invention is to provide a receptacle for the filtered fluid which is mounted adjacent to the filter area itself, which serves as a reservoir for containing the filtered fluid ready to be drawn off for reuse.

It is still yet another advantage of the present invention to provide the filtrate mediums in a disposable cartridge which can be easily and conveniently assembled to the fluid settling tank and within an outermost housing.

It is still yet another advantage of the present invention to provide a fluid filtering device which is inexpensive to manufacture, easy to use, does not require any electrical power or pressure generating equipment and is effective for its intended purpose.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A fluid filter apparatus comprising a housing, a dish, a cartridge-like filter having a filter medium, means to removably secure said cartridge-like filter within a cavity formed by said housing, means to removably secure said dish to said cartridge-like filter, means to fluidly communicate the interior of said dish to the lowermost regions of said cartridge-like filter, means to fluidly communicate said lowermost regions of said cartridge-like filter to the interior of said cartridge-like filter, means to fluidly communicate the uppermost regions of said cartridge-like filter into the interior of said housing, an annular cartridge, said annular cartridge being disposed resting in the uppermost regions of said cartridge-like filter adjacent the uppermost filter medium thereof, said annular cartridge having one or more discharge ports, said discharge ports being engagable with openings in said outermost wall of said cartridge-like filter, and means to manually fluidly communicate into the interior of said housing.

2. The apparatus as claimed in claim 1 wherein said cartridge-like filter further comprises a central passageway communicating from the interior of said dish at one end and to said lowermost region of said cartridge-like filter.

3. The apparatus as claimed in claim 1 wherein said cartridge-like filter comprises a solid exterior wall having one or more openings therein disposed at an elevation adjacent to the uppermost regions of said cartridge-like filter carrying filter medium therewithin.

4. The apparatus as claimed in claim 1 wherein said means to secure said dish to said cartridge-like filter comprises said dish having a central threaded region, said means to fluidly communicate the interior of said disk to the lowermost regions of said cartridge-like filter comprises a pipe, said pipe having a threaded region, said threaded region of said pipe being threadingly engagable with said threaded region of said dish.

5. The apparatus as claimed in claim 1 further comprising a lid, said lid hingeably secured to said dish, said dish having an open mouth region, said lid being disposed coverable over said open mouth region of said dish.

6. The apparatus as claimed in claim 1 wherein said means to manually fluidly communicate comprises a valve, said valve being a manually operated fluid valve, said valve communicating into said interior of said housing.

* * * * *